United States Patent [19]
Graham

[11] 3,709,451
[45] Jan. 9, 1973

[54] WHEEL MOUNTED TOOL SUPPORT MECHANISM

[75] Inventor: Edward P. Graham, Lansing, Mich.
[73] Assignee: FMC Corporation, San Jose, Calif.
[22] Filed: Nov. 16, 1970
[21] Appl. No.: 89,672

[52] U.S. Cl............................248/205 R, 33/203.18
[51] Int. Cl............................................G01b 11/275
[58] Field of Search....248/205 R, 226 A; 33/203.15, 33/203, 203.16, 203.17, 203.18, 203.19, 203.2

[56] References Cited

UNITED STATES PATENTS

| | | | |
|---|---|---|---|
| 2,627,123 | 2/1953 | Taber | 33/203.18 |
| 2,882,608 | 4/1959 | Tursman | 248/205 R |
| 2,475,502 | 7/1949 | Holmes | 33/203.18 UX |
| 3,164,910 | 1/1965 | Manlove | 33/203.18 |

FOREIGN PATENTS OR APPLICATIONS

| | | | |
|---|---|---|---|
| 504,926 | 8/1954 | Canada | 33/203.18 |
| 612,699 | 11/1948 | Great Britain | 33/203.18 |

Primary Examiner—J. Franklin Foss
Attorney—F. W. Anderson, C. E. Tripp and A. J. Moore

[57] ABSTRACT

Wheel mounted mechanism for supporting alignment equipment a substantial distance outwardly from the rim of a wheel on a radial support arm that is rigidly connected with a first pair of spaced rim engaging teeth and is pivotally connected to a crossbar that supports a second pair of rim engaging teeth which pivotally supported teeth compensate for wheel rims that are slightly out-of-round. The teeth in each pair engage the inner surface of the wheel rim and are widely spaced for precluding torsional twisting of the radial support arm due to the weight of the aligning tool when the arm is disposed horizontally.

A method of more firmly mounting the mechanism to the rim is also disclosed and includes the step of locking the pivot point of the pivot bar to the radial arm with three of said teeth in engagement with the inner surface of said rim and with the fourth tooth being disposed outwardly of the rim, and the step of forcing the fourth tooth inwardly to engage and clamp against the inner surface of the rim and to place the mounting mechanism under stress.

4 Claims, 10 Drawing Figures

PATENTED JAN 9 1973
3,709,451
SHEET 1 OF 4
FIG_1
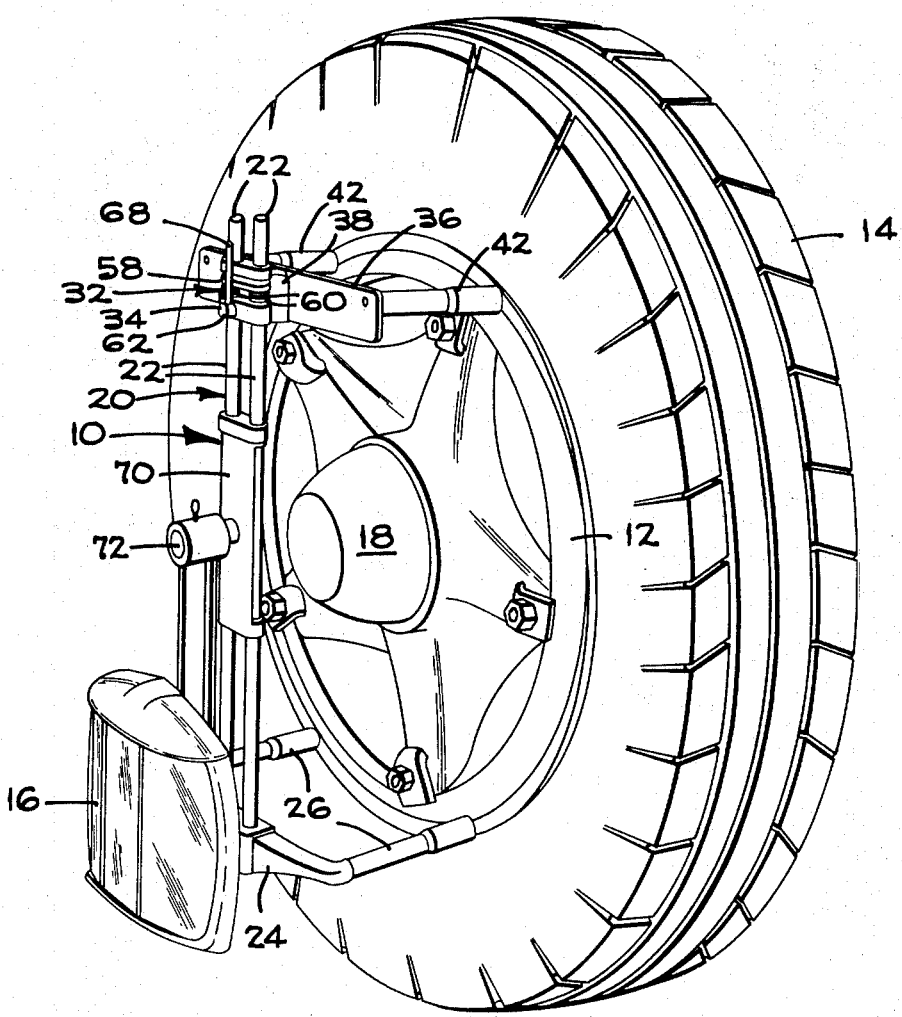
INVENTOR
EDWARD P. GRAHAM
BY C. E. Tripp
-ATTY.
A. J. Moore -AGENT

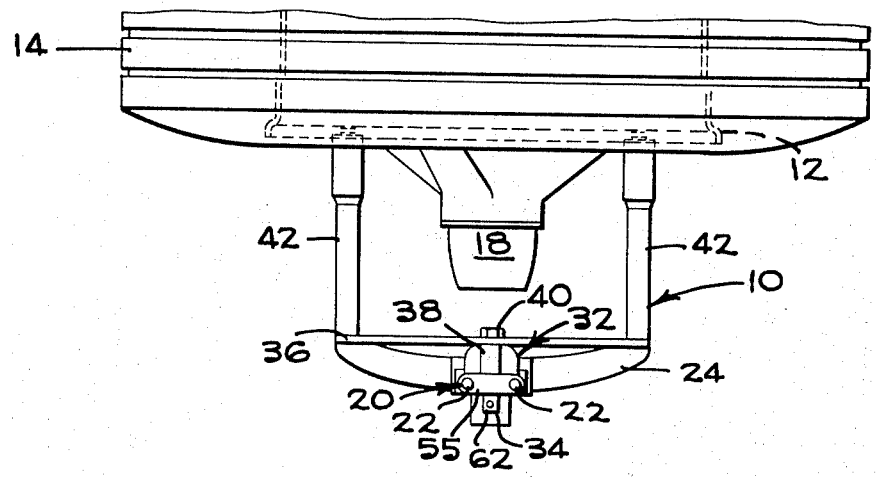
FIG_3
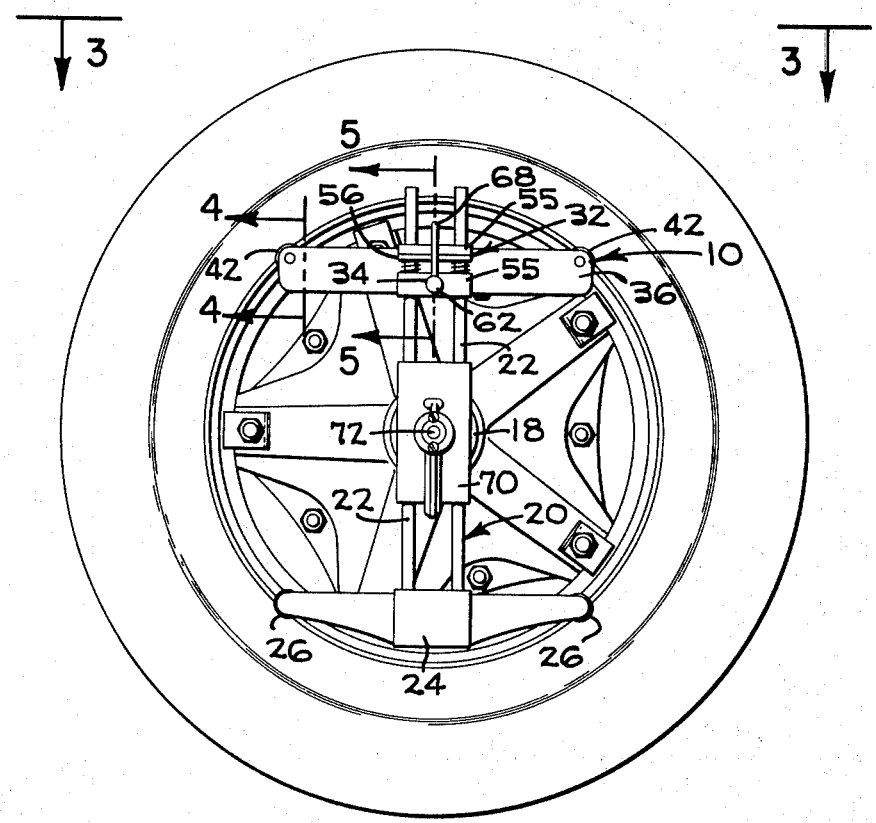
FIG_2

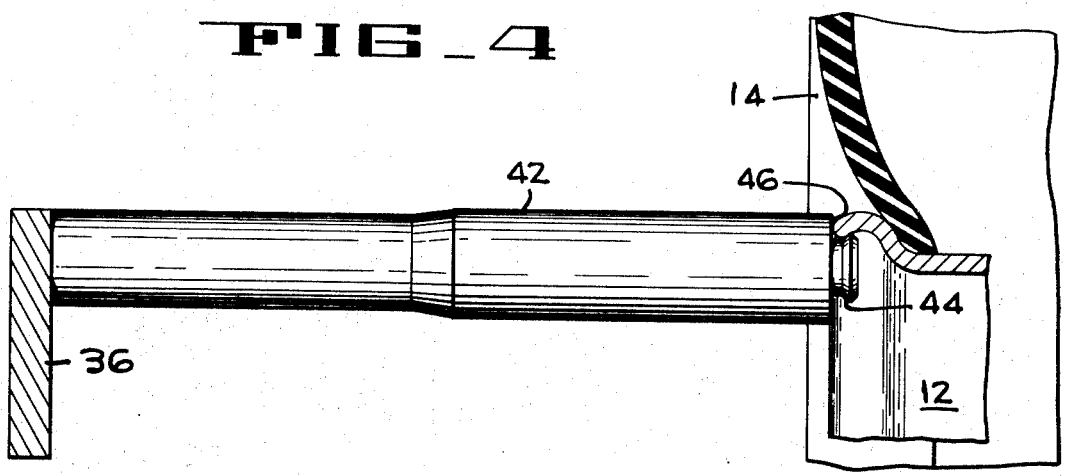
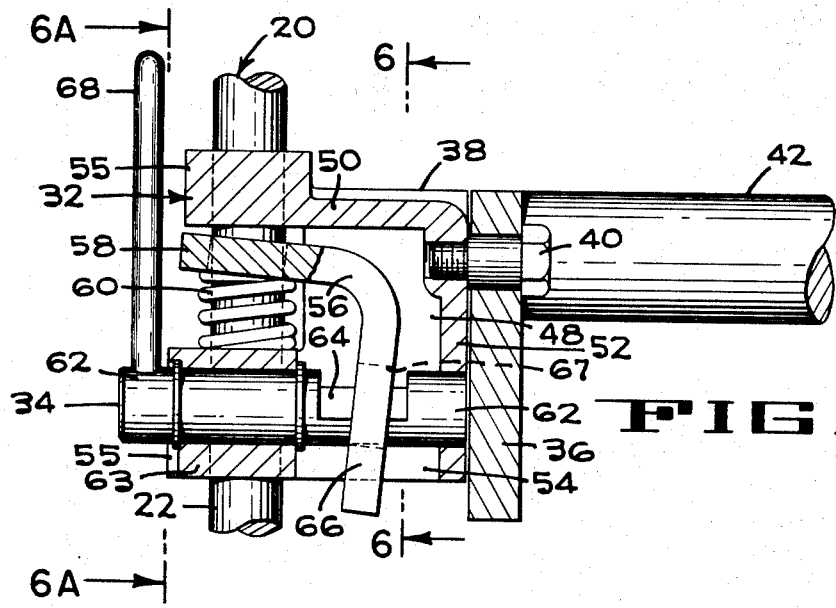
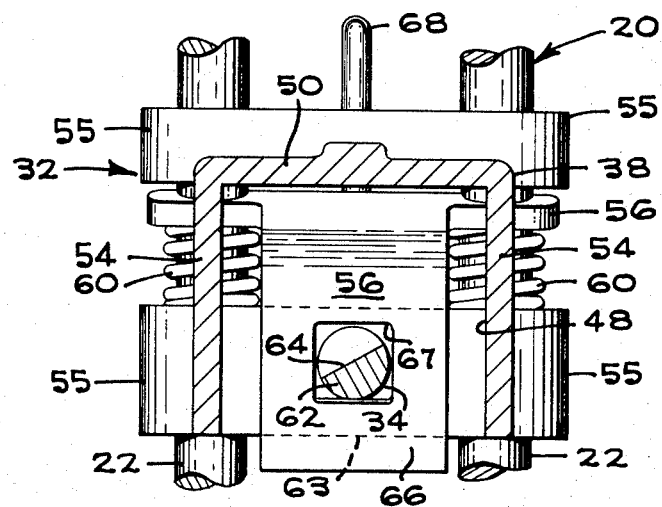

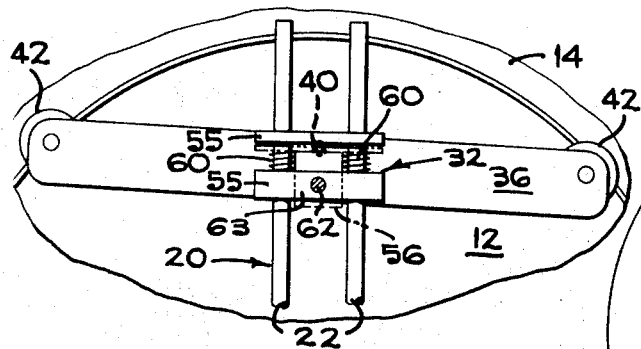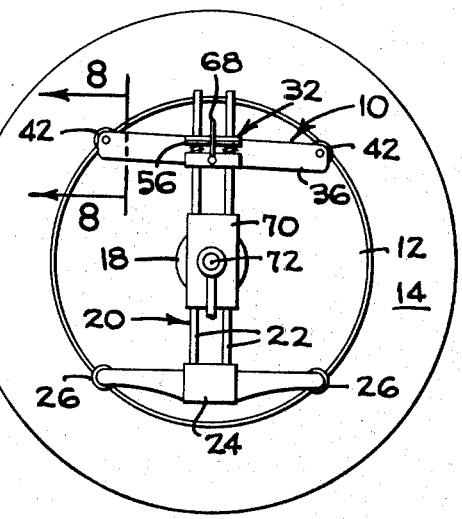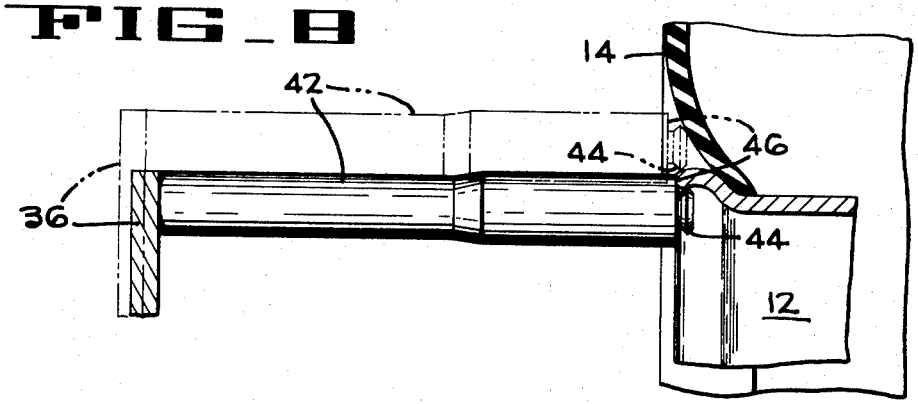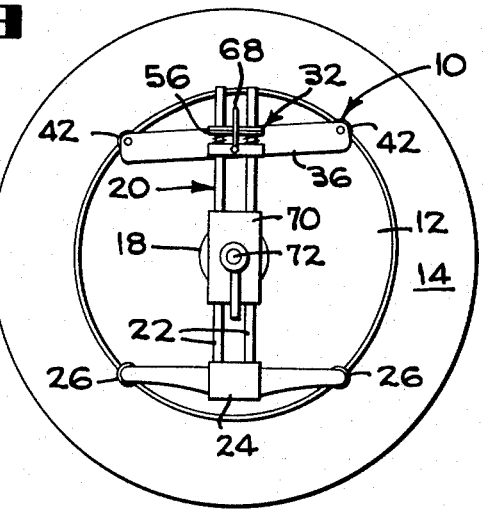

WHEEL MOUNTED TOOL SUPPORT MECHANISM

BACKGROUND OF THE INVENTION

1. Field of the Invention

This invention relates to the wheel alignment art and more particularly relates to a mechanism which is mounted on the rim of a wheel so as to accurately support a wheel aligning tool in a plane parallel to the plane of the wheel rim.

2. Description of the Prior Art

Wheel mounted mechanisms of the type disclosed in assignee's United States Letters Patent to Holmes U.S. Pat. No. 2,475,502 relies on a three-point suspension system which operates quite satisfactorily when mounted on automobile wheels in a plane relatively close to the plane of the wheel rim. However, when the Holmes type three-point suspension wheel mount must extend axially outward a substantial distance from the plane of the wheel rim, it has been determined that the weight of the mirror or other wheel alignment tool that is supported by the mechanism causes the radial tool support arm to torsionally twist thereby causing the third rim gripping tool to pivot at its point of contact with the rim. This condition occurs when the tool support arm is horizontal and the mechanism is mounted on a truck wheel of the type generally known as the "oil reservoir" type having a hub which projects a considerable distance axially outward of the plane of the rim. Any twisting of the tool supporting arms cannot be tolerated because images reflected on the supported mirror would not accurately represent the plane of the wheel and accordingly reliance on such images would result in improper alignment of the wheels.

SUMMARY OF THE INVENTION

The wheel mounted mechanism of the present invention includes a radial tool supporting arm that has a crossbar rigid with one end and the crossbar has a pair of spaced elongated fingers secured thereto and projecting a substantial distance therefrom axially of the wheel. An adjustable clamping mechanism is slidably received on the other end of the radial tool support arm and has a crossbar pivotally connected thereto with a second pair of spaced elongated fingers rigid therewith and projecting axially of the wheel the same effective distance as the first fingers so as to place the radial support arm in a plane parallel to the plane of the wheel rim. A rim engaging tooth is integrally formed on the free end of each finger and serves to clamp the tool supporting mechanism on the rim of the wheel being aligned.

The invention also includes an improved method of firmly attaching the wheel mounted mechanism to the wheel rim so that the supported aligning tool will lie in a plane that is parallel to that of the wheel rim.

It is therefore an object of the present invention to provide a wheel mounted tool supporting mechanism that is capable of reliably supporting a wheel alignment tool in a plane parallel to the plane of the rim of the wheel being tested while supported a considerable distance outwardly of the plane of the rim.

Another object is to provide a tool supporting mechanism having a four-point contact with the rim of a wheel and being capable of gripping either perfectly round or slightly out-of-round wheel rims.

Another object is to provide a method of more tightly mounting the tool supporting mechanism on the rim of a wheel.

BRIEF DESCRIPTION OF THE DRAWINGS

FIG. 1 is a perspective of the wheel mounted tool supporting mechanism of the present invention shown mounted on a truck wheel with the radial tool supporting arm disposed in a vertical testing position and with the alignment testing tool being illustrated as a mirror.

FIG. 2 is an elevation of the apparatus of FIG. 1 with the radial tool supported on the arm in a vertical testing position and with the testing tool being broken away.

FIG. 3 is a plan looking in the direction of arrows 3—3 of a truck wheel having the wheel mounted tool support mechanism connected thereto, the heavy testing tool being broken away.

FIG. 4 is an enlarged section taken along lines 4—4 of FIG. 2 illustrating the manner in which the tooth at the end of one of the rim engaging fingers grips the wheel rim.

FIG. 5 is an enlarged central section taken along lines 5—5 of FIG. 2 illustrating a clamping device in locked position.

FIG. 6 is a sectional taken along lines 6—6 of FIG. 5.

FIG. 6A is an enlarged section taken along lines 6A—6A of FIG. 5 with parts broken away and other parts shown in phantom illustrating the pivot mounting of a pair of the fingers.

FIG. 7 is an operational view in elevation illustrating the method of mounting the wheel mounted tool supporting mechanism on the rim of a truck wheel.

FIG. 8 is a section taken looking in the directions of arrows 8—8 in FIG. 7 and illustrating one of the fingers in phantom lines prior to being locked on the rim and in solid lines in its operative rim engaging position.

FIG. 9 is an operational view showing the wheel mounted mechanism connected to a grossly exaggerated out-of-round rim.

DESCRIPTION OF THE PREFERRED EMBODIMENT

The wheel mounted tool supporting mechanism 10 (FIGS. 1 and 2) of the present invention is clamped onto the rim 12 of a wheel 14 and serves to support a wheel aligning tool 16 (FIG. 1) such as a mirror in a plane that is parallel to the plane of the rim 12. The mechanism 10 is especially designed for use with truck wheels 14 having a hub 18 which projects a substantial distance axially outward beyond the plane of the rim 12.

The wheel mounted mechanism 10 comprises a radial tool supporting arm 20 defined by a pair of spaced parallel rods 22. One end of each rod 22 is rigidly secured to a crossbar 24 which has spaced elongated fingers 26 rigidly connected to its outer ends as by bolting. The fingers 26 are spaced equal distances on opposite sides of the radial arm 20, and are normal to and project a substantial distance from a plane containing the center line of both rods 22.

A clamping device 32 is slidably received on the rods 22 to accommodate wheels of different diameters and may be locked in desired position by a clutch mechanism 34 (FIGS. 5 and 6) as will be described hereinafter. A crossbar 36 is pivotally connected at its midpoint to the body 38 (FIGS. 5 and 6) of the clamp 32 by a shouldered cap screw 40 (FIGS. 5 and 6A). A pair of fingers 42 are secured to the opposite ends of the crossbar 36 as by bolting and extends outwardly therefrom in a direction parallel to the other fingers 26. The fingers 26 and 42 are of sufficient length to maintain the tool supporting arm 20 in a plane that is disposed outwardly of the wheel hub 18 and is parallel to the plane of the wheel rim 12 when teeth 44 (FIGS. 4 and 8) that are formed on the end of each finger 26,42 are clamped to the rim 12.

As best shown in FIG. 4, each tooth 44 is formed outwardly of an annular gauging shoulder 46 formed on the free end of associated fingers 26,42 and is in the form of a disc that is sharpened and subsequently hardened to define a gripping edge which will cling to the inner surface of the wheel rim 12. Prior to locking the teeth 44 of each finger into gripping engagement with the inner surface of the rim of the wheel being tested, each engaging surface is positioned in abutting contact with the peripheral edge of the rim as indicated in FIG. 4. Although the teeth 44 are preferably formed integrally with the associated fingers, it will, of course, be understood that the teeth may be formed as separate units and may thereafter be rigidly secured to the associated fingers 26,42.

The previously referred to clamping device 32 (FIGS. 5 and 6) to which the crossbar 36 is pivotally connected comprises the body 38 having a recess 48 therein. The body is defined by an upper wall 50, a rear wall 52, and vertical walls 54 (FIG. 6) which connect the upper wall to the rear wall. Pairs of aligned hubs 55 are integrally formed on the walls and are bored to slidably receive the rods 22 of the tool supporting arm 20. An angle wedging bar 56 is disposed within the recess 48 and includes a locking flange 58 that is also bored with oversize openings to slidably receive the rods 22 when the flange 58 is held flat against the upper wall 50. Compression springs 60 are wound upon the rods 22 and are disposed between the lower hubs 55 and the locking flange 58, and normally hold the flange 58 flat against the upper wall thereby permitting sliding movement of the clamp 32 relative to the rods 22.

A cam shaft 62 is journaled in an opening formed in a wall 63 that connects the lower hubs, and in an opening in the rear wall 52. The cam shaft has a notch 64 formed therein. A camming flange 66 of the angle wedging bar 56 has a square opening 67 therein that is positioned to receive the notched portion of the shaft 62. When the notch 64 is directed downwardly (FIG. 6) the notch 64 will allow the locking flange 58 to lie flat against the upper wall 50. A lever 68 is secured to the cam shaft 62 and when pivoted to the position illustrated in FIG. 5 and 6 causes the camming flange 66 to move out of the notch 64 and become positioned upon the cylindrical surface of the cam shaft 62. This action causes the angle wedging bar 56 to become cocked as illustrated in FIG. 5 causing the oversize holes in the locking flange 58 to wedge against the rods 22 thereby locking the clamping device 32 in fixed position on the rods 22. It will be seen that rotation of the cam shaft 62 not only locks the angle wedging bar 56 to the rods, but also slightly lifts the body 38, and accordingly, the fingers 42 and teeth 44 to cause the same to grip the internal surface of the wheel rim 12.

The wheel alignment tool 16 (FIG. 1) is illustrated as a mirror although it is to be understood that other tools could be substituted for the mirror. The function of the mirror in the aligning operation is fully disclosed in assignee's U.S. Pat. No. 2,470,090 which issued to Tracy Carrigan et al.

The wheel alignment tool 16 is pivotally attached to a tool supporting slide 70 by a shaft 72. The slide 70 includes bored flanges which are slidably received on the rods 22 and permit the axis of the shaft 72 to be moved to a position coincident with the axis of the wheel being tested. Friction locks (not shown), as fully disclosed in the aforementioned Holmes U.S. Pat. No. 2,475,502 are mounted on the slide 70 and frictionally engage the rods to hold the slide in adjusted position when the wheel 14 and mounting mechanism 10 are rotated between the illustrated vertical position and horizontal positions as is required during the aligning operation.

An important feature of the invention is the method of firmly attaching the wheel mounted tool support mechanism 10 to the rim 12 of the wheel 14 being aligned. As illustrated in FIGS. 6A, 7 and 8, the mechanism is placed on the wheel so that the teeth 44 of the fixed fingers 26 engage the inner surface of the rim 12 with the edge of the rim contacting the gauging shoulders 46. The clamping device 32 is then moved along the rods 22 to a position corresponding to the diameter of the particular wheel being tested and is locked in place on the rods 22 when a tooth 44 of one of the fingers 42 is in engagement with the inner surface of the rim 12 and when the tooth of the other finger 42 is positioned a short distance outwardly of the rim 12 as illustrated in phantom in FIG. 8. With the parts so positioned, the operator grips the finger 42 that is disposed outwardly of the rim 12 and forces it inwardly to a position wherein its tooth 44 engages the inner surface of the rim and its gauging shoulder 46 engages the outer edge of the rim as illustrated in solid lines in FIG. 8. In this way the components of the wheel mounted mechanism 10 are stressed thereby assuring that the teeth 44 will more firmly grip the wheel rim 12 than was heretofore possible, and also eliminates any torsional twisting of the tool supporting arm 20 even though the plane of the radial tool supporting arm 20 is disposed a considerable distance from the plane of the wheel rim 12. Thus, the plane of the tool supporting arm 20 is accurately positioned parallel to the plane of the face of the rim assuring accurate wheel alignment even though the two planes are spaced a substantial distance from each other. The distance between the two planes, i.e., the plane of the rim and the supporting plane which is the plane containing the axes of both rods 22 is on the order of about 7½ inches.

As mentioned previously, the rims 12 of wheels are not always circular but quite frequently are out-of-round as illustrated at exaggerated scales in FIG. 9. However, since the crossbar 36 is pivotally attached to the clamp 32 the crossbar 36 may be pivoted to a position which will compensate for the improperly shaped rims.

It is apparent from the foregoing description that the wheel mounted tool supported mechanism of the present invention provides means which will reliably support a wheel alignment tool in a plane that is parallel to the plane of the wheel rim being tested and at a substantial distance from said wheel rim plane. The invention also contemplates an improved method of more tightly mounting the mechanism on the rim of a wheel, whether the rim is perfectly round or slightly out-of-round thereby assuring that the weight of the tool will not twist the tool supporting arm so that its plane is no longer parallel to the plane of the wheel rim.

Although the best mode contemplated for carrying out the present invention has been herein shown and described, it will be apparent that modification and variation may be made without departing from that is regarded to be the subject matter of the invention.

What I claim is:

1. A wheel mounted tool supporting mechanism for supporting a tool on the rim of a wheel in a plane parallel to the plane of the rim comprising, means defining a radial tool supporting arm having a longitudinal axis, means connecting a tool to said arm, a crossbar rigidly secured to one end of said tool supporting arm, a first pair of fingers rigidly secured to the crossbar at points spaced equal distances from said longitudinal axis, a clamping device slidably mounted on said arm near its other end for accommodating wheels of different diameters, a pivotal crossbar pivotally connected to said clamping device for movement about a pivot axis, a second pair of fingers secured to the pivotal crossbar at points spaced on opposite sides of said axis, said first and second fingers all being normal to a reference plane containing the axis of said radial tool supporting arm and having a rim engaging surface disposed the same distance from said reference plane, a rim engaging tool on the free end of each finger, and means for locking said clamping device on said arm with said pivot axis in a position which causes said teeth to firmly engage the rim of a wheel thereby clamping the rim mounted tool supporting mechanism to the wheel with said reference plane being parallel to the plane of the wheel rim.

2. A wheel mounted tool supported mechanism according to claim 1 wherein the fingers of said second pair are mounted on said pivotal crossbar at equal distances on opposite sides of said longitudinal axis.

3. A wheel mounted tool supporting mechanism according to claim 1 wherein said fingers are of sufficient length to space said reference plane about 7½ inches from the plane of the wheel rim.

4. A method of firmly attaching to the rim of a wheel, a wheel mounted tool supported mechanism which includes four elongated parallel fingers each having a gauging surface and a rim gripping tooth on one end, two of said fingers being transversely spaced from the longitudinal axis of and being rigid with one end of a radial tool supporting arm, and the two other fingers being transversely spaced and pivotally connected to a clamping device for pivotal movement about a pivot axis parallel to said fingers, said clamping device being movably mounted on said arm and adapted to be locked in adjusted position; the method including the steps of placing the supporting mechanism on the rim with three of the teeth engaging the inner surface of the rim so that the gauging surface of the associated fingers contact the edge of the rim and with the fourth tooth and finger disposed radially outward of the rim, locking the pivot axis of said fourth finger in a fixed position relative to said radial arm, and applying an inward force against said fourth finger for forcing said fourth finger to pivot about said pivot axis moving said fourth tooth into engagement with the inner surface of said rim with the gauging surface on the fourth finger engaging the edge of the rim thereby stressing and firmly attaching the tool supporting mechanism to the rim of the wheel.

* * * * *

PO-1050
(5/69)

UNITED STATES PATENT OFFICE
CERTIFICATE OF CORRECTION

Patent No. 3,709,451      Dated January 9, 1973

Inventor(s) Edward P. Graham

It is certified that error appears in the above-identified patent and that said Letters Patent are hereby corrected as shown below:

Column 2, line 26, change "sectional" to --section--.

Signed and sealed this 28th day of January 1975.

(SEAL)
Attest:

McCOY M. GIBSON JR.
Attesting Officer

C. MARSHALL DANN
Commissioner of Patents